(12) United States Patent
Bernsen

(10) Patent No.: US 12,063,700 B2
(45) Date of Patent: Aug. 13, 2024

(54) PREVIOUS CONNECTION STATUS REPORT

(71) Applicant: KONINKLIJKE PHILIPS N.V., Eindhoven (NL)

(72) Inventor: Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 287 days.

(21) Appl. No.: 17/425,741

(22) PCT Filed: Feb. 6, 2020

(86) PCT No.: PCT/EP2020/052957
§ 371 (c)(1),
(2) Date: Jul. 26, 2021

(87) PCT Pub. No.: WO2020/165013
PCT Pub. Date: Aug. 20, 2020

(65) Prior Publication Data
US 2022/0167440 A1 May 26, 2022

(30) Foreign Application Priority Data
Feb. 11, 2019 (EP) .................................... 19156539

(51) Int. Cl.
H04W 76/14 (2018.01)
H04W 4/70 (2018.01)
(Continued)

(52) U.S. Cl.
CPC ............ H04W 76/14 (2018.02); H04W 4/70 (2018.02); H04W 12/06 (2013.01);
(Continued)

(58) Field of Classification Search
None
See application file for complete search history.

(56) References Cited

U.S. PATENT DOCUMENTS

2006/0239208 A1 10/2006 Roberts
2007/0036120 A1 2/2007 Zhang
(Continued)

FOREIGN PATENT DOCUMENTS

EP 1872250 A2 1/2008

OTHER PUBLICATIONS

Device Provisioning Protocol—Technical Specification—Version 1.0, Wi-Fi Alliance, 2018.
(Continued)

Primary Examiner — Otis L Thompson, Jr.

(57) ABSTRACT

Thus there is provided a method and appropriately arranged devices for configuring for communications in a wireless network comprising performing a configuration protocol, and sending by the enrollee device, during an execution of the configuration protocol, a message containing an indication of a status of a previous configuration attempt. A configuring device receiving the status of the previous configuration attempt is then able to act upon it and inform the user that a previous attempt failed. The information provided to the user would allow the user to understand why the device fails to connect to the desired network and perhaps alert them to the fact that it has not connected.

17 Claims, 3 Drawing Sheets

(51) Int. Cl.
  *H04W 12/06* (2021.01)
  *H04W 12/106* (2021.01)
  *H04W 12/50* (2021.01)
  *H04W 12/69* (2021.01)

(52) U.S. Cl.
  CPC ......... *H04W 12/106* (2021.01); *H04W 12/50* (2021.01); *H04W 12/69* (2021.01)

(56) References Cited

U.S. PATENT DOCUMENTS

| | | | | |
|---|---|---|---|---|
| 2014/0010111 | A1* | 1/2014 | Kodama | H04W 8/18 370/254 |
| 2016/0128104 | A1* | 5/2016 | Logue | H04L 63/0823 370/329 |
| 2016/0149901 | A1* | 5/2016 | Liu | H04W 12/50 726/5 |
| 2017/0257819 | A1 | 9/2017 | McCann et al. | |
| 2017/0295448 | A1* | 10/2017 | McCann | H04L 63/06 |
| 2018/0013758 | A1* | 1/2018 | Yu | H04L 63/0846 |
| 2018/0041507 | A1* | 2/2018 | Sivarajan | G06F 21/44 |
| 2018/0109381 | A1* | 4/2018 | Cammarota | H04W 12/041 |
| 2018/0109418 | A1 | 4/2018 | Cammarota et al. | |
| 2018/0358130 | A1* | 12/2018 | Schmidt | G16H 40/20 |
| 2019/0053041 | A1* | 2/2019 | Bergström | H04W 76/18 |
| 2019/0215878 | A1* | 7/2019 | Goto | H04W 12/06 |
| 2019/0238435 | A1* | 8/2019 | Tao | H04W 24/08 |
| 2019/0306710 | A1* | 10/2019 | Cammarota | H04W 12/06 |
| 2019/0380034 | A1* | 12/2019 | Montemurro | H04W 4/50 |
| 2020/0154276 | A1* | 5/2020 | Minakawa | H04W 12/0471 |
| 2020/0396584 | A1* | 12/2020 | Jo | H04W 4/80 |
| 2021/0400502 | A1* | 12/2021 | Zhang | H04W 88/10 |
| 2022/0167440 | A1 | 5/2022 | Bernsen | |
| 2023/0125927 | A1* | 4/2023 | Jactat | H04W 48/18 370/329 |

OTHER PUBLICATIONS

IEEE Standard for Information technology—Telecommunications and information exchange between systems Local and metropolitan area networks—Specific requirements Part 11: Wireless LAN Medium Access Control (MAC) and Physical Layer (PHY) Specifications (Dec. 7, 2016).

Stajano et al "The Resurrecting Duckling: Security Issues for Ad-hoc Wireless Networks" University of Cambridge Laboratory 1999.

Diffie, W.; Hellman, M. (1976), "New directions in cryptography", IEEE Transactions on Information Theory, 22 (6): 644-654.

Synthetic Initialization Vector (SIV) Authenticated Encryption Using the Advanced Encryption Standard (AES), Oct. 2008, (https://datatracker.ietf.org/doc/rfc5297/).

International Search Report and Written Opinion from PCT/EP2020/052957 mailed Aug. 20, 2020.

* cited by examiner

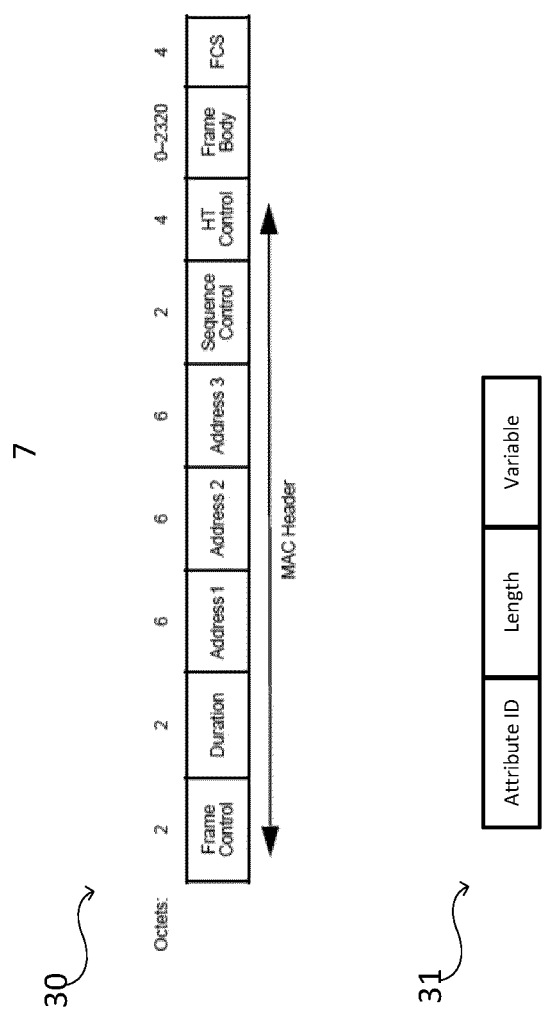

US 12,063,700 B2

PREVIOUS CONNECTION STATUS REPORT

CROSS REFERENCE TO RELATED APPLICATIONS

This application is a U.S. national phase application of International Application No. PCT/EP2020/052957 filed on Feb. 6, 2020, which claims the benefit of EP Application Serial No. 19156539.9 filed on Feb. 11, 2019 and are incorporated herein by reference.

FIELD OF THE INVENTION

The present invention relates to devices and methods for use in wireless networks, in particular those conforming to the IEEE 802.11 family of standards.

BACKGROUND OF THE INVENTION

FIG. 1 represents a wireless network 1 which contains a first device 2 and another device 3. The first device 2 may have a central function and be like an Access Point (AP), a hub or a gateway device. The first device 2 will henceforth be referred to as an AP for simplicity though other types of device are indeed possible. The user (not shown) wishes to add two more devices to the network 1, namely a complex device 4 (here represented as a computer) and a simple device 5 (here represented as a toothbrush). Devices like the simple device 5 often do not have any real user interface (UI) other than perhaps a light and, accordingly, are often called 'headless' devices. The AP 2 has a processor 6 and the simple device 5 has a microcontroller and small non-volatile memory 7 and a button 8 which may be used to reset the simple device 5. There is also a third device 9.

Some wireless networking standards allow for one device to configure another in order to establish a connection and communicate. This makes the task of adding, or enrolling, a new device in a network less onerous in that the user no longer has to make manual entries.

Devices that have a user interface, such as the complex device 4 can show the status of the connection with the AP after configuration and if problems have occurred, for example if the device cannot 'find' the AP (or other device to which the connection is desired). However, with simple (headless) devices, the only way the user can observe a successful connection is by inspecting the UI of the Access Point (AP), hub or gateway. For headless devices, i.e. devices without a user interface, this is not the case. If, after a configuration, these devices run into a problem when trying to connect to the network for which they were configured to connect to, the user has no idea what has gone wrong and may not realise unless they think to check the AP's UI.

The document US2017/257819 discusses the provisioning of headless device but does not consider previous connection attempts.

SUMMARY OF THE INVENTION

Thus there is provide a method of configuring an enrollee device for communications in a wireless network comprising performing a configuration protocol, and sending by the enrollee device, during an execution of the configuration protocol, a message containing an indication of a status of a previous configuration attempt.

A configuring device receiving the status of the previous configuration attempt is then able to act upon it. For example it can terminate the configuration if there is no need or inform the user that a previous attempt failed. The information provided to the user would allow the user to understand why the device fails to connect to the desired network and perhaps alert them to the fact that it has not connected. This is of particular value when the device to be joined to the network is a simple or headless device which is without means to inform the user directly. Such a device may appear to be configured but fail to join. The user may realise that the device has failed to join but not know why or, worse, not even be aware until some later time. Having such a timely indication could save the user a lot of time and effort.

According to an embodiment, wherein the message is one of an authentication request message, an authentication response message, an authentication confirm message or a configuration request message. These messages are exchanged between a configuring device and the device to be enrolled during a configuration process. By including the indication in one or more of these messages, a headless device according to an embodiment is able to inform automatically and without specific user investigation a configuring device according to an embodiment of the result of the previous attempt.

According to an embodiment, the configuration is part of establishing communication between the Enrollee device and another device in the wireless network.

According to an embodiment, the indication comprises information on at least one of a result of the previous configuration attempt, an action performed as part of the previous configuration attempt, a network ID and an indication whether reconfiguration without reset is possible for which the previous configuration attempt was made. With the result of the previous attempt, the configuring device can decide which flow to follow in the configuration and indicate the result to the user. With the network ID, the configuring device can determine that for a device which fails to connect but nevertheless completed configuration a reason for the connection fail.

According to an embodiment, reception of a message containing an indication of a successful previous configuration attempt causes a termination of the configuration protocol, thus avoiding a useless and potentially problem causing re-configuration attempt.

According to an embodiment, reception of a message containing an indication of a previous configuration attempt causes a the receiving device to display a corresponding information on a user interface thus informing the user of a reason for connection problems.

According to an embodiment, the indication is contained in a segment of the message which is not encrypted. This can reduce the computational load for the Configurator at the expense of network security.

According to an embodiment, the indication is contained in a segment of the message which is encrypted. This has the advantage that another malicious device would have greater difficulty obtaining information about the network (i.e. that a certain device had attempted to join and failed because of a certain reason) that could then be used as part of an attempt to penetrate the network.

According to another aspect, there is provided an Enrollee device, arranged for communications in a wireless network, configured to participate in a configuration protocol with a Configurator device, the configuration protocol being arranged to configure the device for communications in the wireless network and to store an indication concerning a previous attempt to configure the device. By storing the result of the previous attempt, the Enrollee device may, when a new attempt to configure it, provide information so that the user may be informed of that result.

According to an embodiment, the Enrollee device is configured to transmit the indication as part of a message of the configuration protocol.

According to an embodiment, the Enrollee device is further configured to erase the store of the indication only after receiving a full reset. Thus, it retains the indication even if a partial reset which prepares it for configuration is performed so that, during the configuration, it may still send the indication.

According to embodiments, the Enrollee is further configured to transmit an indication of how to re-configure the Enrollee device. The indication of how to re-configure comprises at least one of an indication that a reset it required, a text description containing instructions and a URL to a document describing how to re-configure. The Configurator (or whichever other device has a UI) may then display this information to the user to save them having to search for it. The indication may comprise information on whether a reconfiguration overwrites the previous configuration or is added to the previous configurations.

The information on the re-configuration of the Enrollee may be displayed by the Configurator, or by a device connected to the Configurator, so as to save the user time in finding the information. Also the indication of whether the re-configuration adds to or overwrites existing configuration allows an appropriately programmed Configurator to decide whether or not to abort a re-configuration on the device which has been correctly configured.

According to another aspect, there is provided a Configurator device, arranged for configuring a device for communications in a wireless network, configured to participate in a configuration protocol with an Enrollee device and, as part of the configuration protocol, detect in a message from the Enrollee device, an indication concerning a previous attempt to configure the Enrollee device.

According to an embodiment, the Configurator device is further configured to terminate the configuration protocol if the indication indicate a successful configuration. This can be useful where the user only wants to reconfigure because of a problem. The user may have been thinking that there was a connection problem, but can find out that there is no problem with the configuration and so does not need to be redo or change it.

According to an embodiment, the Configurator device determines from the message that a previous attempt to configure the Enrollee device has occurred, to display on a user interface, corresponding information indicating that a previous attempt to configure the Enrollee device has occurred. The Configurator device, being able to detect the indication, can then inform the user of the contents and respond according to those contents by changing the flow of the configuration process.

BRIEF DESCRIPTION OF THE DRAWINGS

The above, as well as additional objects, features and advantages of the disclosed devices, systems and methods, will be better understood through the following illustrative and non-limiting detailed description of embodiments of devices and methods, with reference to the appended drawings, in which:

FIG. 3a represents an exemplary 802.11 MAC frame which may be according to an embodiment.

FIG. 3b represents an attribute according to an embodiment for an 802.11 MAC frame.

DETAILED DESCRIPTION OF EMBODIMENTS

In the following description, same references designate like elements.

Figure 1:
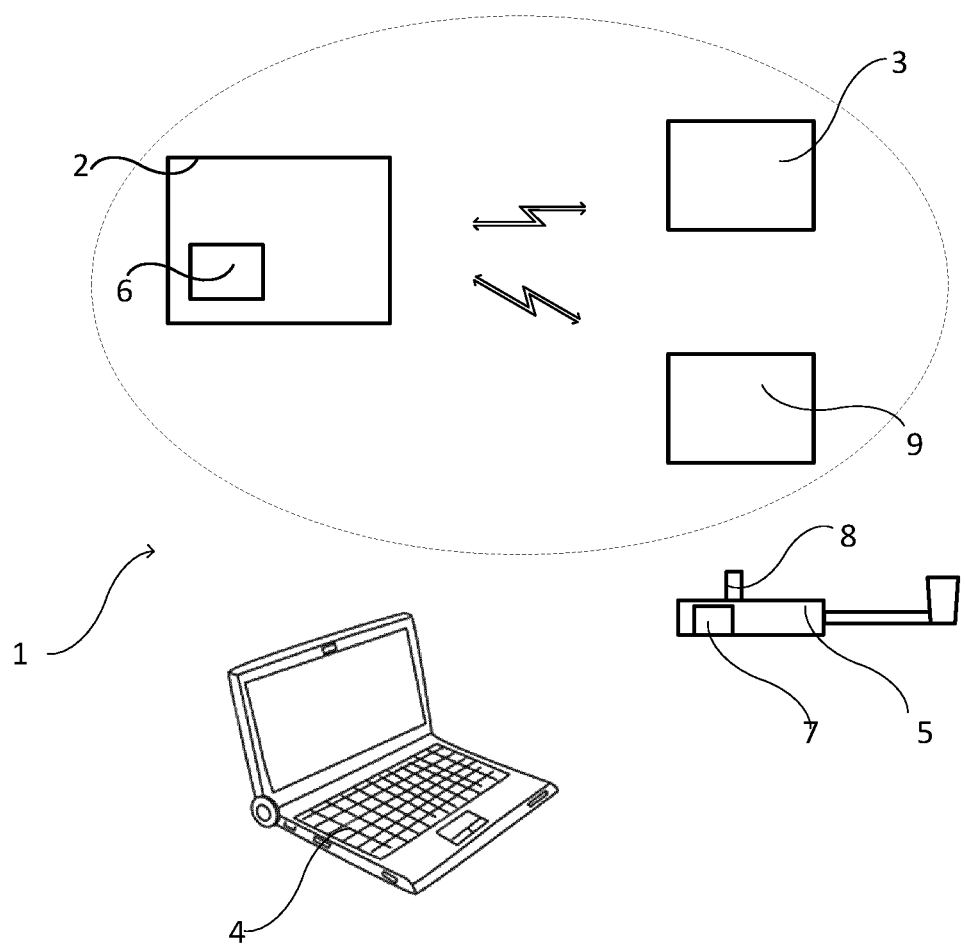
FIG. 1 represents a wireless network for which it is desired to configure devices for addition.
Figure 2:
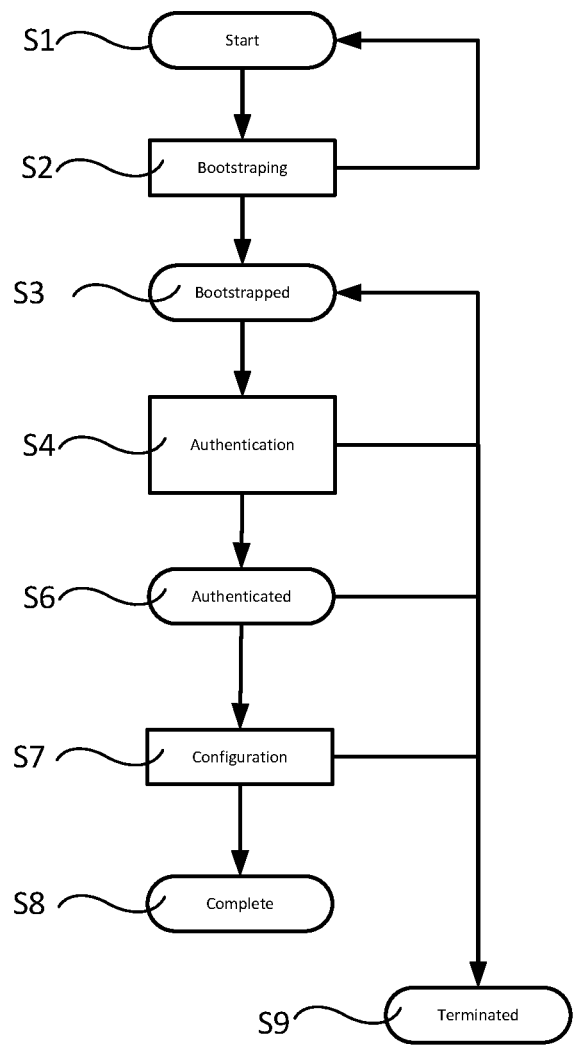
FIG. 2 represents the flow of a configuration process according to an embodiment.

FIG. 2 represents a flow of a device-controlled configuration method according to embodiments whereby one device such as the third device 9 of FIG. 1 may be configured and connected to another device such as the complex or simple devices 4, 5 of FIG. 1. As an example, the case of the simple device 5 will be discussed. It should be understood, that though much of this description provides examples involving a network with a device like the AP 2, the process could work in a peer-to-peer situation.

One example of a device-controlled configuration method is the Device Provisioning Protocol (DPP) which is used in networks using Wi-Fi or IEEE 802.11. In the Device Provisioning Protocol (DPP), a device acting as a DPP Configurator can securely configure any Wi-Fi enabled device for connecting to a Wi-Fi AP.

At S1, the process starts with the two devices 9 and 5 in an unconnected state and device 5 is un-configured. For the purposes of discussion, device 9 will be used to configure device 5 for joining the wireless network 1 so device 9 may be referred to as the Configurator and device 5 as the Enrollee (since it is being 'enrolled' in the wireless network 1).

At S2, often referred to as 'bootstrapping', whereby one device obtains the obtains the bootstrapping public key ($B_R$) of other device and, for the device to be configured. This is by another means than the wireless communication technology and so is commonly called 'out-of-band' communication (OOB). Examples of this can be the user causing one device to read a QR code on the Responder, NFC communication between the two device or another wireless technology e.g. Bluetooth. The bootstrapping process is initiated by a user intervention. If the bootstrapping has been successful, the process arrives as S3 and the devices 9, 5 are 'bootstrapped', otherwise they revert to the 'start' state at S1. In either case, the Enrollee device (in this case the simple device 5) may record in an appropriate storage, for example as a flag in a register in memory, the result of the bootstrapping process. Frequently, simple devices are programmed to wake up after manufacturing or after a reset and turn on their radio on the channel indicated in their QR-code for configuration and starts listening for an authentication request message. (A non-simple device would frequently be set in this mode by its user by e.g. resetting it.)

At S4, the devices 9, 5 perform an authentication procedure whereby the devices establish 'trust' i.e. the user is able to be confident that the devices are what they believe them to be and not other unknown (and potentially malicious) devices 'pretending' to be one or other of the devices in question. A message is sent from one device requesting to start an authentication. This message can be sent by either the device doing the configuring (Configurator) or the device to be configured, the Enrollee. In this example, the third device 9 acts as the Configurator and the simple device 5 as the Enrollee. It should be noted that the third device 9 is shown as being connected to the network 1 though this is not necessarily required for the embodiments to work. The device starting the wireless communication is called the Initiator and the device responding is called the Responder.

The DPP protocol, in particular, allows both a Configurator and an Enrollee device to act as the Initiator of the DPP protocol, whereby the other device automatically becomes the Responder. Simple devices or headless device usually will assume the Responder role.

The other device responds to this message. If the authentication request message is decoded correctly and contains the information indicating that the Initiator is the device the user believes it to be and has the required capabilities, the response message indicates that the message has been 'accepted' and contains information needed by the Initiator to verify the credentials of the Responder and that it too has the required capabilities. If the two devices do not receive from the other device the required information, the process aborts and the device return to the bootstrapped state at S3. If the Initiator is the Enrollee, the authentication request message may also contain an additional part indicating the result of a previous attempt to configure the Enrollee. If the Responder is the Enrollee, then the authentication response message may contain the additional part indicating the result of the previous attempt. It should be understood that the indication also indicates whether or not there has been a previous attempt.

In the case of the DPP protocol, the first message is the Authentication Request message and the response message is the DPP Authentication Response. The Responder checks the DPP Authentication Request message contains a correctly generated cryptographic hash of the Responder public bootstrapping key and whether it has a copy of the Initiator's public bootstrapping key. The responder sends a DPP Authentication Respond message indicating whether the authentication can continue. If not, because for example the attempt to decrypt an encrypted nonce in the DPP Authentication Request message fails, the process is aborted. The DPP Authentication Response contains a cryptographic hash of the Responders public bootstrapping key and may contain the hash of the Initiator public bootstrapping key. Likewise, for the Initiator, the Enrollee may have obtained this public key by an OOB communication. The public bootstrapping key of the Initiator may then be used for mutual authentication. Without the public bootstrapping key of the Initiator, only the Initiator can authenticate the Enrollee, but not the other way around.

In the case of DPP, the indication of the result of a previous attempt may be in the form of a dedicated additional attribute the frame body of the DPP Authentication Request or Response message. The formats and contents of the messages are discussed with reference to FIG. 3.

If the authentication response message indicates that the Responder has accepted the authentication request message and the response meets the criteria imposed by the set-up of the Initiator, the Initiator issues an authentication confirmation message. If the authentication values in the authentication response and the confirmation message are found to be correct by the relevant devices, this part of the protocol, the authentication part, is successful, the process has reached S6 and configuration can start. The confirmation message may also contain an indication of the result of a previous configuration attempt where the Enrollee is also the Initiator.

In the case of the DPP protocol, the authentication confirmation message is the DPP Authentication Confirm message.

At S7, the Enrollee device sends a configuration request message with information on what type of configuration the Enrollee wants. If the Configurator is able to grant the request, it sends a message with the information needed by the Enrollee such as a network key. The process then concludes at S8 with a successful configuration of the Enrollee. According to an embodiment, the configuration request may contain an indication of the result of a previous configuration attempt.

In the case of DPP, the request message is the DPP Configuration Request and the Configurators response is the DPP Configuration Response message. The DPP Configuration Response may contain the service set identifier (SSID) of the network the Enrollee should connect to and may contain a DPP Connector. The DPP Connector can be viewed as a certificate, digitally signed by the Configurator, and contains among other thing the public network access key of the Enrollee. The DPP Configuration Response message also contains the public signing key of the Configuration. Other devices that have been configured by the same Configurator can thereby check whether they can trust the public network access key of other devices. The DPP Configuration Response message may also contain the Wi-Fi passphrase or Pre Shared Key (PSK) of the network. The Enrollee sends a DPP Configuration Result message (depending on the version of DPP) to the Configurator to let it know whether it accepts the configuration or not. Not receiving this message by the Configurator may indicate to the Configurator that there was a Wi-Fi problem between the Configurator and the Enrollee. Then the 'supposedly configured' Enrollee can send its Connector to a DPP configured AP 2. If the Connectors signature is found correct and if the AP 2 has a matching Connector, i.e. a Connector for the same network, signed by the same Configurator, the AP2 sends its own Connector to the Enrollee. The Enrollee and the AP 2 can compute a symmetric key based on each other's network access key in the Connectors and their own private network access key in Diffie-Hellman fashion.

In case the Enrollee received a Wi-Fi password or Wi-Fi Pre Shared key (PSK), the Enrollee tries to associate with the AP 2 in the normal way through the 4-way handshake as specified in [802.11].

On the other hand, if the Enrollee (simple device 5, in this example) does not succeed in connecting, it gives up trying after a time-out period for which it is programmed, it stores the information concerning the configuration attempt and the failure to connect and stops. The time-out may be very long or indefinite. The user, when they perceive that the joining or connection to the network 1 has not worked, may attempt to understand the situation and re-attempt configuration and then have the simple device 5 re-try joining the network 1.

In the event that the Configurator detects that the Enrollee has undergone a previous configuration attempt, a number of possibilities exist and these depend, in part, on how the enrollee is arranged and what the previous result was.

Many devices like the simple device 5 are arranged to hold only one configuration at a time. Furthermore, many are manufactured without configuration but programmed to reject or ignore further attempts to configure them once they have already been configured—a 'configuration-block', for example a flag which is consulted every time an attempt to configure the device occurs. This behavior has been likened to the process of imprinting in certain animals whereby a young animal learns to recognize one other individual as its 'mother' if it sees that individual at a particular time. Once imprinted, the young animal will refuse to consider any other individuals as its mother. To reconfigure such a device, some sort of reset is required to remove the flag that prevents the device from participating in a configuration process. Such a flag could simply be a status flag with values indicating either 'configured' or 'not configured'.

In the event that the previous configuration was a success and was for the network in question, there are various possibilities, depending on how the Enrollee is programmed to behave once it has been configured. If the simple device 5 is programmed to not accept new configurations without a reset, then the configuration process will terminate because the Enrollee will not send the responses required to continue the process.

Also the Configurator may behave in different ways. In one embodiment, the Configurator may be configured to terminate the configuration and proceed directly S8 on the grounds that there may be no point re-doing the exercise (and running the risk that it fails). This branching of the flow may occur as soon as the Configurator has made the determination that the Enrollee has already been successfully configured—for example if the indication was detected in one of the authentication messages. Where the Configurator has a UI, it may inform the user that a previous successful configuration for the network in question occurred. Alternatively, the Configurator can simply continue the process and, if the Enrollee is in a mode to accept configuration, simply add the new configuration to the Enrollee's store of configurations or overwrite the previous configuration (where the Enrollee has only one configuration storage—which is often the case for simple devices. Where the Enrollee also provides information concerning how to configure it (as described below), the Configurator may learn what effect re-configuring would have on the old configuration (for example overwriting) and inform the user via its own or a remote UI on another device, such as the AP 2, connected to the Configurator. The Configurator may also be programmed to continue the configuration for devices that add the new configuration to their configuration storages but stop the configuration for simple devices that can only overwrite the existing configuration.

On the other hand, if the simple device 5 was successfully configured but for another network, then it will need to be re-configured and the situation then becomes the same as if the previous configuration failed.

Where re-configuration is needed—where the previous attempt failed or was not for the right network—the process proceeds to S9 where the Configurator may inform the user via its own UI or via a remote UI of the result of the previous attempt. This may also, in addition to informing the user that configuration is needed again, may indicate whether the device in question requires resetting to make it participate in a new configuration. Where needed, the user may reset the device and re-attempt the configuration. Resetting the simple device 5 could, in addition to removing any configuration-blocks, change the record of previous configuration attempts in a way that avoids the Configurator terminating prematurely the configuration protocol. For example, this could involve changing a value in the record of the previous attempt so that a correspondingly-programmed Configurator can detect the value and continue with the configuration. Alternatively, the Configurator could be programmed to always continue the configuration where the previous result indicates a connection-fail.

Resetting the simple device 5 may be accomplished by means of the button 8. Button 8 might be the power button in which case the reset might be achieved by a short press, as compared to a long press needed to actually power the device off. Alternatively, button 8 may be recessed in a hole so as to avoid accidental resetting.

The simple device 5 may have two levels of reset—a partial reset which would erase any configuration-blocks but not remove the record of the previous configuration attempt and a complete or full reset to set the device back to so-called factory settings, including the configuration block/status flag. Various ways of implementing a two-level reset are possible, such as a short press and a long press or a single press for one level and two in a certain length of time for the other level.

In an embodiment, the simple device 5, once configured, searches for and attempts to connect to the network for which it was configured. If it is able to connect, it does so and remains on the network channel selected between it and the network. If not, the attempt to join times out and the simple device 5 gives up. The simple device 5 then returns to listening to either a default channel or the channel it was given as part of the bootstrapping process. It also sets the connection status flag to 'configured', records information about the failed connection attempt and puts this in a new Connection Status attribute for its next configuration request message.

In one embodiment, the simple device 5 may have a protocol such as a short press for a partial reset and a long press for a full reset.

In one embodiment, for a case where no previous attempt to configure the Enrollee has been made, the indication may be omitted. Where the Configurator notes the absence of the indication, it simply continues the protocol. In another embodiment, the indication is present and contains a value that indicates that no previous attempt to configure has been made. Again, upon noting this situation, the Configurator just continues.

The overall flow of an attempt to add a simple device to the network can be seen from the point of view of the user in the following example which uses the DPP protocol.

The simple device 5 wakes up after manufacturing or after factory reset and turns on its radio on and sets it to the channel indicated in the QR-code for DPP Configuration and starts listening for a DPP Authentication Request message. A non-simple device would be set in this mode by its user.

The simple device 5 receives configuration through the DPP protocol and accepts the configuration in the DPP Configuration response message from the configurator. The simple device tries to connect to the network it was just configured for.

In one case, the simple device 5 is able to connect successfully. It sets its configuration block and so is no longer responsive to DPP Configuration until returned to the factory reset stage. The flow ends here.

In the other case the simple device 5 is not able to connect. It gives up trying to connect after a while, stores the reason for failure in memory as the previous configuration result and becomes responsive again to DPP Configuration either after a simple (so not factory) reset or immediately after giving up on trying to connect to the network. When it is being configured again, it includes the reason of connection failure in one of the four possible messages of the DPP protocol. The reason for failure may be erased from memory during a factory reset.

During an attempt at a new configuration i.e. where the device that is 'new' in the sense that it is not known whether or not the device has ever been configured or connected to the network 1, the following situations may occur.

Either the previous configuration result is absent (e.g. after the simple device 5 has undergone factory reset). The Configurator simply sends the DPP Configuration response to configure the Enrollee as the unmodified DPP protocol prescribes.

Or the previous configuration result is available. Here there are two possibilities.

First, the previous configuration result is success; the configurator simply sends the DPP Configuration Response to the Enrollee. A simple device would 'forget' the previous configuration and (attempt to) use the new configuration exclusively. A non-simple device and especially mobile device such as a lap top or smart phone would add the new configuration to its list of configurations, so it remains able to connect to previously configured networks when moving around. The Enrollee may have included information indicating whether it would add to or overwrite its existing configuration storage.

Two, the previous configuration result was failure; the Configurator may show this to the user. The user may try to rectify this situation based on this. The user may e.g. decide to configure the device for a different network for which the APs are closer to the Enrollee or the user may simply try the same configuration again. Finally, a DPP Configuration Response message is sent with the DPP Status code set to STATUS_OK and containing a DPP Configuration object. In practical terms, the user may also try and remedy the situation by e.g. moving the Enrollee closer to the AP, or vice-versa, setting the Wi-Fi channel of the AP to a channel that is supported by the Enrollee, etc. In taking these actions, the user will abort the DPP Configuration and a DPP Configuration Response message is sent with the DPP Status code set to STATUS_CONFIG_REJECTED. The Enrollee will either become responsive again for DPP Configuration after a simple reset or remain responsive to DPP Configuration (depending on its programming). Normally, a DPP Configuration Response message is sent within a fraction of a second after reception of the DPP Configuration Request and the time-out of the Enrollee for waiting for the DPP Configuration Response message may be in the order of a second. When timed out, the Enrollee may decide to send its DPP Configuration Request again, because the DPP Configurator may not have received the previous request (for example because of noise). For both cases when the previous configuration result was failure (configure anew or reject configuration), the DPP Configuration Response message will not be sent quickly after reception of the DPP Configuration Request, to allow the user has to judge the situation and decide on an action. This may take tens of seconds. Accordingly, the Enrollee should set its time-out for waiting for the DPP Configuration Response message to a much larger value, something in the order of maybe even a minute or more.

An alternative solution could be to extend the (DPP) Configuration phase, by sending the Configuration Result message again after the Enrollee has successfully connected to the AP 2. The problem with this is that the Enrollee may take a long time to search for the AP 2 on many channels, during which time, the Configurator has to remain on the configuration channel and listen for the Enrollee—the process may time-out. If the Enrollee has actually connected to the AP 2, the Enrollee then has to leave the AP channel again in order to send the DPP Configuration Result message, which is inefficient and increases the risk that the overall process then fails.

As explained elsewhere herein, a headless device like the simple device 5 is often implemented such that it goes into configuration mode or becomes responsive to (DPP) configuration after a factory reset. As mentioned previously, a device may have problems with network access after having been configured. A headless device may give up trying to connect to the network it was configured for after a while and e.g. go back to the simple reset state (in which it still has the configuration and network access problems available for reporting to a configurator) or it may go into the mode again in which it is responsive to (DPP) configuration. If the user wants to configure the device again, the user has to reset the device for the device according to the first example, but not if the device is of the type that returns automatically to being ready to be configured. In order to aid the user on how to reconfigure a device, the device may include an another attribute in any of the messages sent to the configurator in which it may also include the PrevCon attribute in which the device provides information on how to reconfigure it. This attribute may be called the ReconfigureInfo attribute. This maybe anything from a simple 1-bit value of yes/no reset required for reconfiguration, to a textual description on how to reconfigure it or a URL pointing to a document that describes how to reconfigure it. This attribute may indicate how long the device will try to connect to the network before it becomes responsive again for reconfiguration. This is especially useful for headless devices. Devices should include this ReconfigureInfo attribute already in any of the messages sent to the configurator during the first configuration attempt, so that the configurator has this information available to show to the user when the user suspects that the just configured device has problems accessing the network. This may be in the form of a button saying "Press place X in case of connection problems". The ReconfigureInfo attribute may also contain an indication of whether a new configuration will overwrite an existing configuration or will be added to it.

The proposed embodiments have the advantage that the user may be informed of the reason why a device, particularly a simple or headless device will not join or associate with a desired network. Furthermore, the user may be made aware of the problem without having to check the UI of the AP 2. Because the detection of the problem is based on a determination of there having been a previous attempt and that determination is made while executing a configuration procedure rather than after the procedure, the need to interrupt communications in order to check the success of the configuration is avoided. Additionally, the user may be informed of actions they may need to take to remedy the situation.

FIG. 3 represents an example of a Medium Access Control (MAC) frame. The example in question is that of the IEEE 802.11 standard. It should be understood however that other formats are possible as long as there is a frame body or payload part. For the purposes of the present, the other parts, frame header and the error checking (here FCS) are not important.

In the DPP Configuration Protocol phase of DPP, the general MAC frame format is that of the GAS Frame according to the IEEE 802.11 standard. In the DPP Authentication protocol phase of DPP, the general MAC frame format is that of the Public Action frame according to the IEEE 802.11 standard. Attributes may be added to the Authentication Request, Authenication Response Authentication Confirm and Configuration Request messages. The new attributes are named herein 'PrevCon' and 'ReconfigurationInfo' for convenience, though other naming may be used. Between them, they contain the information on the previous configuration attempt, what is needed for re-configuration and whether the re-configuration overwrites or appends. In an embodiment, these are structured as separate attributes and in another embodiment, the information is is presented in a single attribute structure.

The format of the information part DPP Authentication Request message for an Enrollee device according to one embodiment is:

SHA256($B_R$), SHA256($B_I$), PI, [Channel] {I-nonce, I-capabilities, PrevCon}$_{k1}$
where
$B_R$ is the Responders public bootstrapping key
$B_I$ is the Initiators public bootstrapping key
PI is Initiator Protocol Key
[channel] is an optional indication of a channel preferred by the Initiator
I-nonce is the Initiator nonce
I-capabilities is the Initiator capabilities
PrevCon is the result of the previous attempt
{ }$_{k1}$ means that the information inside the curly brackets has been encrypted by AES-SIV (RFC5297) using key k1. In addition to encryption, so confidentiality protection, AES-SIV provides integrity protection of the information that is encrypted. In addition, the encryption process of AES-SIV may protect the integrity of additional, in-the-clear data (Authenticated Associated Data). During AES-SIV decryption, the change of any bit in the AAD and encrypted information will be detected and the decryption of the encrypted data will be declared invalid. In DPP, the attributes before the attributes in between the curly brackets are part of the Authenticated Associated Data.

In another embodiment, the format is:
SHA256($B_R$), SHA256($B_I$), PI, PrevCon, [Channel] {I-nonce, I-capabilities}$_{k1}$ In this embodiment, the attribute concerning the previous configuration attempt (PrevCon) is sent in-the-clear i.e. unencrypted. The PrevCon attribute should be part of the Authenticated Associated Data (AAD) used for the AES-SIV encryption of {I-nonce, I-capabilities}$_{k1}$ in order to protect the integrity of the PrevCon attribute.

In another embodiment, the encrypted part (represented between { }) or the unencrypted part may also include the attribute ReconfigurationInfo.

In the DPP Authentication part of the Configuration Protocol and where the Responder device is the Enrollee, the format of the DPP Authentication Response according to an embodiment is:
DPP Status, SHA256($B_R$), SHA256($B_I$), {R-nonce, I-nonce, R-capabilities, PrevCon, {R-auth}$_{ke}$}$_{k1}$
where PrevCon is the attribute concerning a previous configuration attempt, as before.

In another embodiment, the format is:
DPP Status, SHA256($B_R$), SHA256($B_I$), PrevCon, {R-nonce, I-nonce, R-capabilities, {R-auth}$_{ke}$}$_{k1}$ In this embodiment, the attribute concerning the previous configuration attempt (PrevCon) is sent in-the-clear i.e. unencrypted. The PrevCon attribute should be part of the Authenticated Associated Data (AAD) used for the AES-SIV encryption of {R-nonce, I-nonce, R-capabilities, {R-auth}$_{ke}$}$_{k1}$ in order to protect the integrity of the PrevCon attribute.

In another embodiment, the encrypted part (represented between { }) or the unencrypted part may also include the attribute ReconfigurationInfo.

In the DPP Authentication part of the Configuration Protocol and where the Responder device is the Configurator, the format of the DPP Authentication Confirm according to an embodiment is:
DPP Status, SHA256($B_R$), SHA256($B_I$), {PrevCon, I-auth}$_{ke}$
where PrevCon is the attribute concerning a previous configuration attempt, as before.

In another embodiment, the format is:
DPP Status, SHA256($B_R$), SHA$_{256}$($B_I$), PrevCon, {I-auth}$_{ke}$ In this embodiment, the attribute concerning the previous configuration attempt (PrevCon) is sent in-the-clear i.e. unencrypted. The PrevCon attribute should be part of the Authenticated Associated Data (AAD) used for the AES-SIV encryption of {I-auth}$_{ke}$ in order to protect the integrity of the PrevCon attribute.

In another embodiment, the encrypted part (represented between { }) or the unencrypted part may also include the attribute ReconfigurationInfo.

The format of the DPP Configuration Request, according to one embodiment is:
{E-nonce, configAttrib, PrevCon}$_{ke}$
where E-nonce is the Enrollee's nonce and configAttrib is the DPP Configuration Atttribute as defined in the DPP specification.

In another embodiment, the format is:
PrevCon, {E-nonce, configAttrib}$_{ke}$

In this embodiment, the attribute concerning the previous configuration attempt (PrevCon) is sent in-the-clear i.e. unencrypted. The PrevCon attribute should be part of the Authenticated Associated Data (AAD) used for the AES-SIV encryption of {E-nonce, configAttrib}$_{ke}$ in order to protect the integrity of the PrevCon attribute.

In another embodiment, the encrypted part (represented between { }) or unencrypted part may also include the attribute ReconfigurationInfo.

The format of the DPP configuration Response is:
DPP Status, {E-nonce, configurationObject}$_{ke}$ FIG. 3b shows the general format of the attribute, PrevCon 31. The Attribute ID identifies the attribute as being a record of a previous configuration attempt. The length describes the length of the following part, the variable. The variable may contain some or all of the following information:

Result i.e. success or fail where success may mean that the Enrollee was able to contact an AP that uses the SSID configured in the Enrollee and was able to associate with that AP successfully using the DPP Connector, the Wi-Fi passphrase or the Wi-Fi PSK that the Enrollee received during configuration, so that it has obtained network access to the configured SSID,
Reason for fail,
SSID of the network or which the previous attempt was made,
the transmit power used in trying to connect to the network,
the list of Wi-Fi channels searched for the network,
a list of SSIDs that were found when scanning Wi-Fi channels but which found SSIDs are different from the SSID to connect to, The 'reason for fail' could be:
the Enrollee was able to contact an AP that uses the SSID configured in the Enrollee and send its DPP Connector to this AP in a DPP Peer Discovery Request message, but the DPP Peer Discovery Response message received from the AP returned DPP Status "STATUS_INVALID_CONNECTOR" or "STATUS_NO_MATCH". Reasons for these error codes are listed in clause 6.4.1 of [DPP]
the Enrollee was able to contact an AP that uses the SSID configured in the Enrollee, but the Wi-Fi passphrase or Wi-Fi PSK (Pre Shared Key) configured in the Enrollee proved to be incorrect when the Enrollee tried to associate with the AP.
the Enrollee scanned a list of channels (list included) but could not find an AP with the configure SSID.
the configuration failed.

The general format of the attribute ReconfigurationInfo has the same general structure.

Since the Configurator has to detect this, it must be programmed accordingly to parse the messages correctly. It should be understood that this is adds complexity and lengthens the execution time for the Configurator. There is also added complexity on the Enrollee side in that more complicated firmware and larger non-volatile memory are required. It should be borne in mind that there is great downward price pressure on such devices and even apparently small additions demand justification. Furthermore many such devices are battery-powered and any extra energy expenditure, such as retrieving information, composing more complex messages and sending those more complex and longer messages is actively discouraged, particularly where the batteries are small and intended to last a long time.

Aspects of the embodiments may be implemented in a computer program product, which may be a collection of computer program instructions stored on a computer readable storage device which may be executed by a computer. The instructions may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The following may be used as reference documents:

[802.11] IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), December 2016

[DH] Diffie, W.; Hellman, M. (1976), "New directions in cryptography", IEEE Transactions on Information Theory, 22 (6): 644-654

[DPP] Device Provisioning Protocol—Technical Specification—Version 1.0, Wi-Fi Alliance, 2018, https://www.wi-fi.org/file-member/device-provisioning-protocol-specification.

[RD] The Resurrecting Duckling: Security Issues for Ad-Hoc Wireless Networks, University of Cambridge Computer Laboratory, https://www.cl.cam.ac.uk/~fms27/papers/1999-StajanoAnd-duckling.pdf

[RFC5297] Synthetic Initialization Vector (SIV) Authenticated Encryption Using the Advanced Encryption Standard (AES), October 2008, (https://datatracker.ietforg/doc/rfc5297/)

The invention claimed is:

1. A method of configuring a simple enrollee device for communications in a wireless network comprising:
performing a configuration protocol, and
sending, by the simple enrollee device, during an execution of the configuration protocol, a message containing an indication of a status of a previous configuration attempt and an indication of the reason if the previous configuration attempt failed,
wherein the configuration protocol is part of establishing a connection between the simple enrollee device and another device in the wireless network, and
wherein the status of the configuration attempt includes an indication of whether the connection was successful.

2. The method of claim 1 wherein the message is one of an authentication request message, an authentication response message, an authentication confirm message or a configuration request message.

3. The method of claim 1, wherein the indication comprises information on at least one of a result of the previous configuration attempt, an action performed as part of the previous configuration attempt, a network ID and an indication whether reconfiguration without reset is possible for which the previous configuration attempt was made.

4. The method of claim 1, wherein reception of a message containing an indication of a successful previous configuration attempt causes a termination of the configuration protocol.

5. The method of claim 1, wherein reception of a message containing an indication of a previous configuration attempt causes a receiving device to display a corresponding information on a user interface.

6. The method of claim 1, wherein the indication is contained in a segment of the message that is not encrypted.

7. The method of claim 1, wherein the indication is contained in a segment of the message that is encrypted.

8. A simple enrollee device, arranged for communications in a wireless network, comprising:
a memory, and
a processor that is configured to participate in a configuration protocol,
wherein the configuration protocol is arranged to configure the simple enrollee device for communications in the wireless network and
wherein the processor stores an indication concerning a previous attempt to configure the device and an indication of the reason if the previous configuration attempt failed in the memory,
wherein the configuration protocol is part of establishing communication connection between the simple enrollee device and another device in the wireless network, and
wherein the indication concerning the previous attempt includes an indication of whether the connection was successful.

9. The simple enrollee device of claim 8, further configured to transmit the indication as part of a message of the configuration protocol.

10. The simple enrollee device of claim 8, further configured to transmit an indication of how to re-configure the Enrollee device.

11. The simple enrollee device of claim 10, wherein the indication of how to reconfigure comprises at least one of an indication that a reset it required, an indication that a text description contains instructions, and an indication of a URL to a document describing how to reconfigure.

12. The simple enrollee device of claim 8, further configured to transmit an indication whether a reconfiguration overwrites the previous configuration or is added to the previous configurations.

13. The simple enrollee device of claim 8, further configured to erase the indication from the memory only after receiving a full reset.

14. A configurator device, comprising:
a communication element, and
a processor,
    wherein the processor is arranged for configuring a device, via the communication element, for communications in a wireless network,
    wherein the processor is configured to participate in a configuration protocol with an enrollee device and,
    wherein, as part of the configuration protocol, the processor is configured to detect a message from the enrollee device,
    wherein the message includes an indication concerning a previous attempt to configure the enrollee device,
    wherein the configuration protocol is part of establishing a connection between the simple enrollee device and an other device in the wireless network, and
    wherein the indication concerning the previous attempt includes an indication of whether the connection was successful.

15. The configurator device of claim 14, further configured to terminate the configuration protocol if the indication indicates a successful configuration.

16. The configurator device of claim 14, further configured to display on a user interface, corresponding information indicating that the previous attempt to configure the enrollee device has occurred if the configurator device determines from the message that the previous attempt to configure the enrollee device was successful.

17. The configurator device of claim 14, further configured to display on a user interface, corresponding information indicating that the connection between the simple device and the other device was successful.

* * * * *